United States Patent
Hahm et al.

(10) Patent No.: US 9,807,140 B2
(45) Date of Patent: Oct. 31, 2017

(54) METHOD, TERMINAL, AND SYSTEM FOR REPRODUCING CONTENT

(71) Applicant: Samsung Electronics Co., Ltd., Suwon-si, Gyeonggi-do (KR)

(72) Inventors: Seong-il Hahm, Yongin-si (KR); Han-min Bang, Gangneung-si (KR); Jin-guk Jeong, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 308 days.

(21) Appl. No.: 14/294,609

(22) Filed: Jun. 3, 2014

(65) Prior Publication Data
US 2015/0058450 A1   Feb. 26, 2015

(30) Foreign Application Priority Data
Aug. 23, 2013  (KR) .................. 10-2013-0100573

(51) Int. Cl.
| | |
|---|---|
| *H04L 29/06* | (2006.01) |
| *H04N 21/436* | (2011.01) |
| *H04N 7/18* | (2006.01) |
| *G06F 3/14* | (2006.01) |

(52) U.S. Cl.
CPC .......... *H04L 65/604* (2013.01); *G06F 3/1454* (2013.01); *G06F 3/1462* (2013.01); *H04L 65/4069* (2013.01); *H04L 65/4084* (2013.01); *H04L 65/80* (2013.01); *H04L 67/38* (2013.01); *H04N 7/183* (2013.01); *H04N 21/43615* (2013.01); *G09G 2340/0407* (2013.01); *G09G 2340/14* (2013.01); *G09G 2370/16* (2013.01); *G09G 2380/10* (2013.01)

(58) Field of Classification Search
CPC . H04L 65/4069; H04L 65/4084; H04L 65/80; H04L 65/604; H04L 67/38; H04N 7/183; H04N 21/43615; G06F 3/1454; G06F 3/1462
See application file for complete search history.

(56) References Cited

U.S. PATENT DOCUMENTS

| | | |
|---|---|---|
| 2006/0031779 A1 | 2/2006 | Theurer et al. |
| 2009/0307428 A1 | 12/2009 | Schmieder et al. |
| 2010/0169502 A1* | 7/2010 | Knowlson ........... H04L 67/2847 709/231 |
| 2012/0154678 A1 | 6/2012 | Chang et al. |
| 2012/0179834 A1* | 7/2012 | van der Schaar ............. H04N 21/23439 709/231 |
| 2013/0033504 A1 | 2/2013 | Nugent et al. |
| 2013/0198322 A1 | 8/2013 | Oran et al. |
| 2013/0219072 A1 | 8/2013 | Han et al. |

(Continued)

FOREIGN PATENT DOCUMENTS

WO     02/45372 A2   6/2002

*Primary Examiner* — Larry Donaghue
(74) *Attorney, Agent, or Firm* — Jefferson IP Law, LLP

(57) ABSTRACT

A method of reproducing content is provided. The method includes, when a sync terminal reproduces content by receiving the content from a source terminal via a certain network, reproducing the content in a mirroring mode during a certain time, buffering image data corresponding to the content to be reproduced after the certain time, during the certain time, and reproducing the content in a streaming mode after the certain time by using the buffered image data.

20 Claims, 10 Drawing Sheets

(56) References Cited

U.S. PATENT DOCUMENTS

| | | | |
|---|---|---|---|
| 2013/0221083 A1* | 8/2013 | Doss | H04W 12/04 235/375 |
| 2014/0082146 A1* | 3/2014 | Bao | H04L 65/605 709/219 |
| 2014/0365611 A1* | 12/2014 | Praveenkumar | H04L 69/24 709/219 |

* cited by examiner

METHOD, TERMINAL, AND SYSTEM FOR REPRODUCING CONTENT

CROSS-REFERENCE TO RELATED APPLICATION(S)

This application claims the benefit under 35 U.S.C. §119(a) of a Korean patent application filed on Aug. 23, 2013 in the Korean Intellectual Property Office and assigned Serial number No. 10-2013-0100573, the entire disclosure of which is hereby incorporated by reference.

TECHNICAL FIELD

The present disclosure relates to a method, terminal, and system for reproducing content. More particularly, the present disclosure relates to a method of reproducing content transceived between a plurality of terminals, a terminal for executing the method, and a system for executing the method.

BACKGROUND

Due to development of wired and wireless communication networks, electronic devices for displaying screens so as to output data that is visually recognizable to users may be connected to each other via the wired and wireless communication networks.

The electronic devices may transmit and receive various types of data to and from each other via the wired and wireless communication networks. In addition, one electronic device may remotely control another electronic device, or one electronic device may be used via another electronic device. According to the related art, for the above-described remote controlling or remote accessing of another electronic device, a mirroring technology is required.

The mirroring technology is a technology for allowing devices having display units to share and manipulate screen data. For example, the mirroring technology may allow Personal Computers (PCs) to share and use screen data.

In detail, a screen mirroring technology refers to a function of displaying a screen of a source terminal on a display of a sync terminal. The sync terminal may perform screen mirroring by receiving image data corresponding to the screen of the source terminal.

In detail, if screen mirroring is performed, then a sync terminal may receive image data corresponding to a screen of a source terminal from the source terminal via a wired or wireless network, and may display the screen of the source terminal on a display of the sync terminal based on the received image data.

If a plurality of devices are shared by using screen mirroring, then content stored in one terminal may be transmitted to and reproduced by another terminal.

If content to be reproduced has a large data size (e.g., a video), then large amounts of time and wireless resources are required to transmit the content from one terminal to another terminal.

Therefore, if a plurality of devices are shared, a method and apparatus for minimizing the amount of wireless resources used and for increasing a transmission speed are required.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method of rapidly reproducing content in a sync device when a mirroring service is used, a terminal for executing the method, and a system for executing the method.

Another aspect of the present disclosure is to provide a method of reproducing content at a high transmission speed by using minimum wireless resources, a terminal for executing the method, and a system for executing the method.

Additional aspects will be set forth in part in the description which follows and, in part, will be apparent from the description, or may be learned by practice of the presented embodiments.

In accordance with another aspect of the present disclosure, a method of reproducing content is provided. The method includes, when a sync terminal reproduces content by receiving the content from a source terminal via a certain network, reproducing the content in a mirroring mode during a certain time, buffering image data corresponding to the content to be reproduced after the certain time, during the certain time, and reproducing the content in a streaming mode after the certain time by using the buffered image data.

In accordance with another aspect of the present disclosure, the certain time may be determined based on at least one of a duration of the content, a size of the image data buffered during the certain time, a bandwidth of the certain network, and a bit rate of image data reproduced in the mirroring mode.

In accordance with another aspect of the present disclosure, the method may further include obtaining at least one of the duration of the content, the size of the image data buffered during the certain time, the bit rate of the image data reproduced in the mirroring mode, and the bandwidth of the certain network, determining the certain time based on the obtained at least one of the obtained at the duration of the content, the size of the image data buffered during the certain time, the bit rate of the image data reproduced in the mirroring mode, and the bandwidth of the certain network, comparing the determined certain time to a preset maximum buffering time, and determining whether to reproduce the content in the streaming mode, according to a result of the comparing of the determined certain time to the preset maximum buffering time.

In accordance with another aspect of the present disclosure, the reproducing of the content may include reproducing image data corresponding to a certain region of a screen of the source terminal, and the method may further include receiving the image data corresponding to the certain region, as data to be reproduced in the streaming mode, and receiving image data corresponding to a remaining region of the screen of the source terminal other than the certain region, as data to be reproduced in the mirroring mode.

In accordance with another aspect of the present disclosure, the method may further include, while the content is reproduced in the streaming mode, detecting that underflow is generated, and reproducing the content in the mirroring mode if generation of underflow is detected.

In accordance with another aspect of the present disclosure, the method may further include receiving metadata of the content from the source terminal, and reproducing the content based on the received metadata.

In accordance with another aspect of the present disclosure, the reproducing of the content may include obtaining the content from a memory of the sync terminal based on the received metadata, and reproducing the content by using the obtained content.

In accordance with another aspect of the present disclosure, a method of reproducing content is provided. The method includes, when a source terminal transmits content to a sync terminal via a certain network, transmitting the content in a mirroring mode during a certain time, and transmitting image data corresponding to the content to be reproduced after the certain time, in a streaming mode during the certain time.

In accordance with another aspect of the present disclosure, the certain time may be determined based on at least one of a duration of the content, a size of image data buffered during the certain time, a bandwidth of the certain network, and a bit rate of image data reproduced in the mirroring mode.

In accordance with another aspect of the present disclosure, the method may further include obtaining at least one of the duration of the content, the size of the image data buffered during the certain time, the bit rate of the image data reproduced in the mirroring mode, and the bandwidth of the certain network, determining the certain time based on the obtained at least one of the obtained at the duration of the content, the size of the image data buffered during the certain time, the bit rate of the image data reproduced in the mirroring mode, and the bandwidth of the certain network, comparing the determined certain time to a preset maximum buffering time, and determining whether to transmit the content in the streaming mode, according to a result of the comparing of the determined certain time to the preset maximum buffering time.

In accordance with another aspect of the present disclosure, the transmitting of the content may include transmitting image data corresponding to a certain region of a screen of the source terminal, to the sync terminal, and the method may further include transmitting image data corresponding to a remaining region of the screen of the source terminal other than the certain region, as data to be reproduced in the mirroring mode.

In accordance with another aspect of the present disclosure, the method may further include, while the content is transmitted in the streaming mode, detecting that underflow is generated in the sync terminal, and transmitting the content in the mirroring mode if generation of underflow is detected.

In accordance with another aspect of the present disclosure, the method may further include transmitting metadata of the content to the sync terminal, receiving a response regarding the transmitted metadata from the sync terminal, and transmitting the content according to the received response.

In accordance with another aspect of the present disclosure, the transmitting of the content may include determining whether the content is stored in the sync terminal, according to the received response, and transmitting the content according to a result of the determining whether the content is stored in the sync terminal.

In accordance with another aspect of the present disclosure, a sync terminal is provided. The sync terminal includes a communication unit configured to receive content from a source terminal via a certain network in order to reproduce the content, a control unit configured to control the content to be reproduced in a mirroring mode during a certain time, and to control the content to be reproduced in a streaming mode after the certain time, and a memory configured to buffer image data corresponding to the content to be reproduced after the certain time, during the certain time.

In accordance with another aspect of the present disclosure, a source terminal is provided. The source terminal includes a communication unit configured to transmit content to a sync terminal via a certain network, and a control unit configured to control the content to be transmitted in a mirroring mode during a certain time, to control image data corresponding to the content to be reproduced after the certain time, to be transmitted in a streaming mode, during the certain time, and to control the image data corresponding to the content, to be transmitted in the streaming mode after the certain time.

In accordance with another aspect of the present disclosure, a system for reproducing content is provided. The system includes a source terminal configured to, when content is transmitted to a sync terminal via a certain network, transmit the content in a mirroring mode during a certain time, to transmit image data corresponding to the content to be reproduced after the certain time, in a streaming mode during the certain time, and to transmit the image data corresponding to the content, in the streaming mode after the certain time, and a sync terminal configured to reproduce the content in the mirroring mode during the certain time, to buffer the image data corresponding to the content to be reproduced after the certain time, during the certain time, and to reproduce the content in the streaming mode after the certain time by using the buffered image data.

In accordance with another aspect of the present disclosure, a method for reproducing content is provided. The method includes receiving, by the sync terminal, content to be reproduced from a source terminal, reproducing, by the sync terminal, the content in a mirroring mode if a preset condition is not satisfied, buffering, the sync terminal, image data corresponding to the content to be reproduced, and reproducing, by the sync terminal, the content in a streaming mode if the preset condition is satisfied.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

The same reference numerals are used to represent the same elements throughout the drawings.

DETAILED DESCRIPTION

Figure 1:
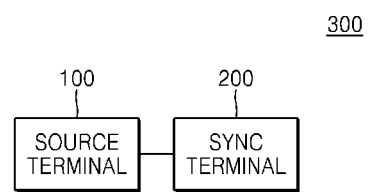
FIG. 1 is a block diagram of a system for reproducing content according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following descriptions and claims are not be limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Throughout the specification, the term 'image' may refer to an 'image' itself, and may also refer to various types of video data, for example, a 'frame', a 'field', and a 'slice'.

As used herein, expressions such as "at least one of," when preceding a list of elements, modify the entire list of elements and do not modify the individual elements of the list.

According to various embodiments of the present disclosure, an electronic device may include communication functionality. For example, an electronic device may be a smart phone, a tablet Personal Computer (PC), a mobile phone, a video phone, an e-book reader, a desktop PC, a laptop PC, a netbook PC, a Personal Digital Assistant (PDA), a Portable Multimedia Player (PMP), an mp3 player, a mobile medical device, a camera, a wearable device (e.g., a Head-Mounted Device (HMD), electronic clothes, electronic braces, an electronic necklace, an electronic appcessory, an electronic tattoo, or a smart watch), and/or the like.

According to various embodiments of the present disclosure, an electronic device may be a smart home appliance with communication functionality. A smart home appliance may be, for example, a television, a Digital Video Disk (DVD) player, an audio, a refrigerator, an air conditioner, a vacuum cleaner, an oven, a microwave oven, a washer, a dryer, an air purifier, a set-top box, a TV box (e.g., Samsung HomeSync™, Apple TV™, or Google TV™), a gaming console, an electronic dictionary, an electronic key, a camcorder, an electronic picture frame, and/or the like.

According to various embodiments of the present disclosure, an electronic device may be a medical device (e.g., Magnetic Resonance Angiography (MRA) device, a Magnetic Resonance Imaging (MRI) device, Computed Tomography (CT) device, an imaging device, or an ultrasonic device), a navigation device, a Global Positioning System (GPS) receiver, an Event Data Recorder (EDR), a Flight Data Recorder (FDR), an automotive infotainment device, a naval electronic device (e.g., naval navigation device, gyroscope, or compass), an avionic electronic device, a security device, an industrial or consumer robot, and/or the like.

According to various embodiments of the present disclosure, an electronic device may be furniture, part of a building/structure, an electronic board, electronic signature receiving device, a projector, various measuring devices (e.g., water, electricity, gas or electro-magnetic wave measuring devices), and/or the like that include communication functionality.

According to various embodiments of the present disclosure, an electronic device may be any combination of the foregoing devices. In addition, it will be apparent to one having ordinary skill in the art that an electronic device according to various embodiments of the present disclosure is not limited to the foregoing devices.

FIG. 1 is a block diagram of a system for reproducing content, according to an embodiment of the present disclosure.

Referring to FIG. 1, the system 300 may include a source terminal 100 and a sync terminal 200.

Each of the source terminal 100 and the sync terminal 200 displays a certain screen, and may be one of various types of devices used by a user. For example, each of the source terminal 100 and the sync terminal 200 may be an electronic device. However, the above-mentioned devices are merely examples, and devices currently developed and commercialized, or to be developed may also be included.

According to various embodiment of the present disclosure, the source terminal 100 may transmit image data corresponding to a screen region displayed on a display of the source terminal 100, to the sync terminal 200. For example, the source terminal 100 may capture the screen of the source terminal 100 in a certain time cycle, may compress the captured screen into image data, and may transmit the compressed image data to the sync terminal 200. Alternatively, the source terminal 100 may transmit screen data currently displayed on the screen of the source terminal 100, to the sync terminal 200.

The sync terminal 200 may display the screen of the source terminal 100 on a display of the sync terminal 200 by using the image data received from the source terminal 100 and including the screen of the source terminal 100. In detail, one or more compressed image data received from the source terminal 100 may be decoded, and the decoded image data may be displayed. According to various embodiments of the present disclosure, the sync terminal 200 may display the screen of the source terminal 100 on the display of the sync terminal 200 by using the screen data received from the source terminal 100.

The sync terminal 200 may display the screen of the source terminal 100 in real time or in a certain time cycle, by using the screen data of the source terminal 100 received from the source terminal 100 or an external device. For example, the sync terminal 200 may display the screen of the source terminal 100 simultaneously with the source terminal 100, or after about several seconds.

Alternatively, the sync terminal 200 may display the screen of the source terminal 100 displayed at a certain point of time, by using the screen data of the source terminal 100 received from the source terminal 100 or an external device.

For example, according to a user input, the sync terminal 200 may display the screen of the source terminal 100 displayed at 2:00 PM yesterday, 10 minutes ago, or the like.

If the screen of the source terminal 100 includes content such as an image or a video, the quality of the content included in the screen of the source terminal 100 displayed on the sync terminal 200 may be lower than the quality of original content. The quality of the content displayed on the sync terminal 100 may be lower than the quality of the original content because the screen of the source terminal 100 displayed on the sync terminal 200 may obtained by compressing the screen region of the source terminal 100, and decoded content is compressed again.

In other words, some data may be lost when content is compressed. For example, decoded content may be determined to have data loss when compared to the content before being compressed. Therefore, if decoded and displayed content is compressed again, the data loss may be increased. Therefore, if the screen of the source terminal 100 is compressed due to screen mirroring, then because the content displayed on the source terminal 100 and having data loss is compressed once again, the data loss may be increased.

In addition, if a resolution of a display screen of the source terminal 100 is reduced, then the quality of content displayed on the display screen may also be reduced. For example, if the source terminal 100 is a mobile terminal having a small display, then the resolution may be reduced. Therefore, if the screen of the source terminal 100 is compressed due to screen mirroring, then because content data having a low quality is compressed, loss of the content data may be increased.

Therefore, in order to prevent the loss and quality reduction of the content data, the sync terminal 200 may obtain original content data instead of receiving the image data obtained by compressing the screen of the source terminal 100. In other words, encoded content data may be directly received from the source terminal 100 or an external device including the content data, or may be obtained from a memory of the sync terminal 200.

In addition, according to various embodiments of the present disclosure, because the sync terminal 200 directly obtains original content data, the content may not be repeatedly decoded and encoded, and thus an unnecessary waste of resources may be reduced.

According to various embodiments of the present disclosure, a mirroring mode refers to an operation mode for transmitting the image data obtained by compressing the screen of the source terminal 100, in real time, and is received and reproduced by the sync terminal 200 in real time. In other words, transmission and reproduction in the mirroring mode may refer to transmission or reception and reproduction of the image data currently displayed on the screen of the source terminal 100.

According to various embodiments of the present disclosure, a streaming mode refers to an operation mode for receiving and reproducing original content data stored in the source terminal 100 or an external device. In other words, transmission and reproduction in the streaming mode may refer to transmission or reception and reproduction of the original content data stored in the source terminal 100 or an external device.

According to various embodiments of the present disclosure, while the sync terminal 200 displays the screen of the source terminal 100 in the mirroring mode, if the screen of the source terminal 100 includes video content, the sync terminal 200 may reproduce and display the content in the streaming mode. If the sync terminal 200 reproduces the content in the streaming mode, then the content may be received and buffered in a memory during a certain time, and may be reproduced and displayed after the certain time. Therefore, during the certain time for buffering the content, although the source terminal 100 reproduces and displays the content, the sync terminal 200 may not display the content, and a user may not view the content on the sync terminal 200 and thus may experience inconvenience.

According to various embodiments of the present disclosure, when the content displayed on the screen of the source terminal 100 is transmitted to the sync terminal 200, the source terminal 100 may transmit the content in the mirroring mode during the certain time for buffering the content. In addition, during the certain time, the source terminal 100 may transmit image data corresponding to the content to be reproduced after the certain time, in the streaming mode.

Therefore, according to various embodiments of the present disclosure, the sync terminal 200 may reproduce the content in the mirroring mode during the certain time, and may receive and buffer the image data corresponding to the content to be reproduced after the certain time, from the source terminal 100, while the content is reproduced in the mirroring mode.

Although the following description is provided on the assumption that the content is a video, the content is not limited thereto and may include a still image (e.g., a photo, or an image), music, and/or the like. For example, according to various embodiments of the present disclosure, during the certain time for displaying an image in the mirroring mode, the sync terminal 200 may receive original data of image data from the source terminal 100. If the original data is completely received, then the sync terminal 200 may decode and display the original data on the screen of the sync terminal 200.

In addition, in the following description, if the content is a photo or an image, then reproduction of the content by the sync terminal 200 may include decoding and displaying of a photo or image data on the screen, as well as reproduction of a video.

Figure 2:
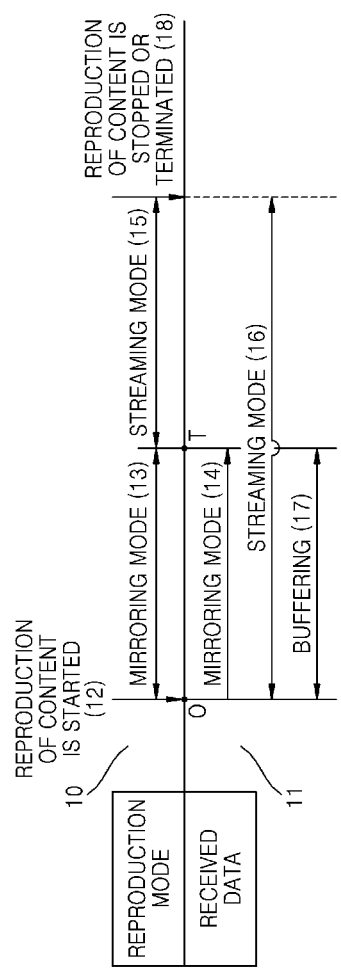
FIG. 2 is a timetable for describing a method of reproducing content, according to an embodiment of the present disclosure.

FIG. 2 is a timetable for describing a method of reproducing content, according to an embodiment of the present disclosure.

Referring to FIG. 2, the timetable may be divided into a region 10 showing a reproduction mode of content displayed on the sync terminal 200, and a region 11 showing data received by the sync terminal 200. Hereinafter, an example that the sync terminal 200 receives and reproduces content stored in the source terminal 100 is described.

At operation 14, the sync terminal 200 may receive content data from the source terminal 100 in a mirroring mode during a certain time T. In this case, the received data may be screen data displayed on a screen of the source terminal 100, instead of original data of the content data.

At operation 13, the sync terminal 200 may reproduce and display the content displayed on the screen of the source terminal 100, in the mirroring mode by using the received data.

During the certain time T for reproducing the content in the mirroring mode, at operation 16, the sync terminal 200 may receive content data from the source terminal 100 in a streaming mode. At operation 17, the sync terminal 200 may buffer the received content data in a memory. In this case, the received content data may be original data of the content data, and may be content data to be reproduced after the certain time T. In other words, the content data received from a time point 0 in the streaming mode at operation 16 may be content data to be reproduced in the streaming mode after the certain time T at operation 15.

According to various embodiments of the present disclosure, during the certain time T for reproducing the content in the mirroring mode, the sync terminal 200 may receive the content data from the source terminal 100 and may buffer the content data in the memory. In this case, the buffered content data may be the content data to be reproduced after the certain time T.

Therefore, according to various embodiments of the present disclosure, the sync terminal 200 may reproduce and display the content data in the mirroring mode during the certain time T for buffering the content data, and may reproduce and display the content after the certain time T by using the content data buffered during the certain time T.

At operation 18, the reproduction of the content is stopped or terminated.

If the reproduction of the content in the streaming mode is stopped or terminated in operation 18, then the sync terminal 200 may stop the reproduction of the content in the streaming mode, and may display image data corresponding to the screen of the source terminal 100, in the mirroring mode.

Methods of reproducing content with respect to the sync terminal 200, according to various embodiments of the present disclosure, will now be described with reference to FIGS. 3 and 4.

Figure 3:
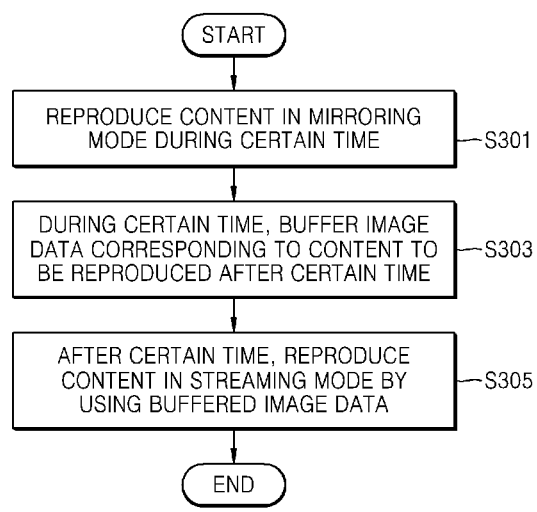
FIGS. 3 and 4 are flowcharts of a method of reproducing content with respect to a sync terminal according to embodiments of the present disclosure.

FIG. 3 is a flowchart of a method of reproducing content with respect to the sync terminal, according to an embodiment of the present disclosure.

Referring to FIG. 3, at operation S301, if the sync terminal 200 shares and uses content of the source terminal 100, then the sync terminal 200 may reproduce the content in a mirroring mode during a certain time. In this case, the sync terminal 200 may receive and reproduce content data from the source terminal 100 in the mirroring mode.

According to various embodiments of the present disclosure, the content displayed on a screen of the sync terminal 200 may be a screen displayed on a partial region of the screen of the source terminal 100. The sync terminal 200 may receive and reproduce image data corresponding to a certain region of the screen of the source terminal 100, as data to be reproduced in a streaming mode. In addition, the sync terminal 200 may receive and reproduce image data corresponding to a remaining region of the screen of the source terminal 100 other than the certain region, as data to be reproduced in the mirroring mode.

In the screen displayed on the source terminal 100, the image data corresponding to the screen displayed on the sync terminal 200 may be transmitted in the mirroring mode and the streaming mode during the certain time, and may be transmitted in the streaming mode after the certain time.

At operation S303, during the certain time, the sync terminal 200 may buffer image data corresponding to the content to be reproduced after the certain time, in a memory of the sync terminal 200. In order to allow the sync terminal 200 to reproduce the content in the streaming mode after the certain time, the content to be reproduced after the certain time may be buffered.

Referring to FIG. 2, during the certain time T from the time point 0, the content to be reproduced after the certain time T is transmitted and received in the streaming mode.

At operation S305, after the certain time, the sync terminal 200 may reproduce the content in the streaming mode by using the image data buffered at operation S303.

According to various embodiments of the present disclosure, if screen mirroring is performed and content is displayed, the sync terminal 200 may receive and reproduce image data corresponding to the content, in the streaming mode. Therefore, because the sync terminal 200 may receive and reproduce the image data corresponding to the content in the streaming mode after the certain time, the content may be reproduced without reducing the quality of the content.

In addition, according to various embodiments of the present disclosure, if content is displayed on the screen of the source terminal 100, during the certain time, then the sync terminal 200 may reproduce the content in the mirroring mode and may buffer image data corresponding to the content to be reproduced after the certain time. Therefore, during the certain time for buffering the content, the sync terminal 200 may reproduce the content in the mirroring mode and may display the reproduced content.

Therefore, inconvenience experienced by a user because, when content is reproduced in the streaming mode, buffering is not completed in an early stage of reproduction and thus the content is not reproducible during a certain time, may be solved.

Figure 4:
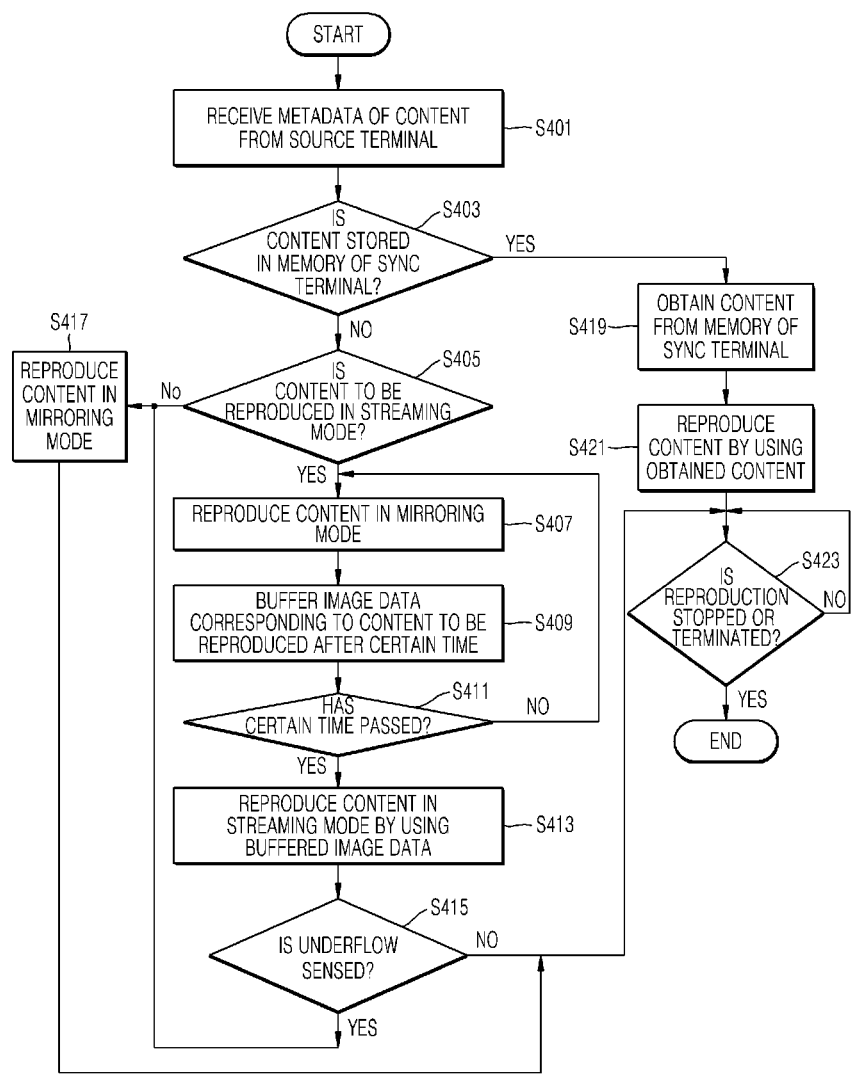

FIG. 4 is a flowchart of a method of reproducing content with respect to the sync terminal, according to an embodiment of the present disclosure.

Operations S301, S303, and S305 of FIG. 3 correspond to operations S407, S409, S411, and S413 of FIG. 4, and repeated descriptions thereof are not provided.

In contrast to the method illustrated in FIG. 3, in the method illustrated in FIG. 4, the sync terminal 200 may reproduce content according to whether content data displayed on a screen of the source terminal 100 is stored in the sync terminal 200.

Referring to FIG. 4, at operation S401, the sync terminal 200 may receive metadata of content displayed on the screen of the source terminal 100, from the source terminal 100.

According to various embodiments of the present disclosure, the metadata of the content, which is received by the sync terminal 200, may include information about the content (e.g., location information of the content such as a Uniform Resource Locator (URL) address, a size of the content data, a creation date of the content, a frame rate, a bit rate, and a duration) and/or the like. If screen mirroring is performed and content is displayed on the screen of the source terminal 100, then the source terminal 100 may obtain and transmit metadata of the displayed content to the sync terminal 200. The metadata of the content may be stored in a memory of the source terminal 100 and/or an external device. Alternatively, if a request for transmitting the content from the source terminal 100 to the sync terminal 200 is received, then the metadata may be transmitted from the source terminal 100 to the sync terminal 200.

At operation S403, the sync terminal 200 may determine whether the content displayed on the screen of the source terminal 100 is stored in a memory of the sync terminal 200. For example, the sync terminal 200 may determine whether the content displayed on the screen of the source terminal is stored in a memory of the sync terminal 200 by using the metadata received at operation S401.

According to various embodiments of the present disclosure, a message including a result of the determination at operation S403 of whether the sync terminal 200 stores the content displayed on the source terminal may be transmitted from the sync terminal 200 to the source terminal 100. The source terminal 100 may determine whether to transmit the content data to the sync terminal 200, based on the message received from the sync terminal 200.

If the sync terminal 200 determines that the content displayed on the screen of the source terminal 100 is stored in the memory of the sync terminal 200 at operation S403, then the sync terminal 200 may proceed to operation S419 at which the sync terminal 200 may obtain the content data displayed on the screen of the source terminal 100, from the memory of the sync terminal 200. Thereafter, the sync terminal 200 may proceed to operation S421.

At operation S421, the sync terminal 200 may reproduce the content by using the content data obtained at operation S419. In other words, when the screen of the source terminal 100 is displayed on the sync terminal 200, the sync terminal 200 may reproduce and display the content displayed on the screen of the source terminal 100, by using the content data stored in the memory of the sync terminal 200.

According to various embodiments of the present disclosure, in addition to or as an alternative to the memory of the sync terminal 200, the sync terminal 200 may reproduce the content by using the content displayed on the screen of the source terminal 100, which is stored in a memory of a peripheral device of the sync terminal 200. For example, the peripheral device of the sync terminal 200 may be another device of a user who has the sync terminal 200 or the source terminal 100, or a device included in the same home network as the sync terminal 200.

The content data may be received from the peripheral device or the source terminal 100 by determining whether receiving the content data from the peripheral device of the sync terminal 200 is more appropriate than to receiving the content data from the source terminal 100. For example, if a communication speed between the peripheral device and the sync terminal 200 is higher than the communication speed between the source terminal 100 and the sync terminal 200, the sync terminal 200 may receive and reproduce the content data from the peripheral device.

At operation S423, the sync terminal 200 may determine whether reproduction of the content displayed on the screen of the source terminal 100 is stopped or terminated.

If the sync terminal 200 determines that the reproduction of the content displayed on the screen of the source terminal 100 is stopped or terminated at operation S423, then the sync terminal 200 may stop or terminate the reproduction of the content, and may continue the screen mirroring. In other words, if the reproduction of the content is stopped or terminated, the sync terminal 200 may receive image data obtained by capturing the screen of the source terminal 100, from the source terminal 100, and may display the screen of the source terminal 100 in a mirroring mode.

In contrast, if the sync terminal 200 determines that the content displayed on the screen of the source terminal 100 is not stored in the memory of the sync terminal 200 at operation S403, then the sync terminal 200 may proceed to operation S405 at which the sync terminal 200 may determine whether to reproduce the content displayed on the screen of the source terminal 100 in the streaming mode. For example, the sync terminal 200 may determine whether to reproduce the content displayed on the screen of the source terminal 100 in the mirroring mode or a streaming mode. For example, while the content is reproduced in the mirroring mode, the sync terminal 200 may receive and buffer the content data in the streaming mode, and may determine whether to reproduce the content in the streaming mode by using the buffered content data, after a certain time. In this case, the sync terminal 200 may determine whether to reproduce the content displayed on the screen of the source terminal 100, in the mirroring mode or the streaming mode according to a user input, according to user preferences, or according to a method of determining whether to reproduce the content by switching from the mirroring mode to the streaming mode as described below with reference to FIG. 7.

The sync terminal 200 may determine whether to reproduce the content in the mirroring mode or the streaming mode, and may transmit a result of the determination (e.g., of the mode in which the content is to be reproduced) to the source terminal 100. Alternatively, the source terminal 100 may determine whether to reproduce the content in the mirroring mode or the streaming mode, and may transmit a result of the determination to the sync terminal 200.

Although the sync terminal 200 or the source terminal 100 may determine whether to reproduce the content in the mirroring mode or the streaming mode, the determination is not limited thereto, and an external device may determine whether to reproduce the content in the mirroring mode or the streaming mode, and may transmit a result of the determination to the sync terminal 200 or the source terminal 100. For example, the external device may determine whether to reproduce the content in the mirroring mode or the streaming mode on the sync terminal 200 according to a user input received by the external device. The sync terminal 200 or the source terminal 100 may receive the result of the determination from the external device. As an example, the external device may be a server (e.g., a server providing a subscription service and/or the like).

If the sync terminal 200 determines that the content is not to be reproduced in the streaming mode (e.g., if the sync terminal 200 determines to reproduce the content in the mirroring mode) at operation S405, then the sync terminal 200 may proceed to operation S417 at which the sync terminal 200 may reproduce the content in the mirroring mode and may display the reproduced content on a screen of the sync terminal 200. According to various embodiments of the present disclosure, the sync terminal 200 may reproduce the content in the mirroring mode until the reproduction of the content is stopped or terminated at operation S423 according to a user input or a duration of the content.

In addition, the sync terminal 200 may reproduce the content in the mirroring mode at operation S417 before the reproduction is stopped or terminated, and may determine to reproduce the content in the streaming mode in operation S405 according to a user input.

If the sync terminal 200 determines to reproduce the content in the streaming mode at operation S405, then the sync terminal 200 may proceed to operation S407.

At operation S407, the sync terminal 200 may reproduce the content in the mirroring mode.

According to various embodiments of the present disclosure, if the sync terminal 200 reproduces the content in the mirroring mode, then the sync terminal 200 may display a User Interface (UI) indicating that the content is being reproduced in the mirroring mode on the screen of the sync terminal 200.

At operation S409, the sync terminal 200 may buffer image data corresponding to the content to be reproduced after the certain time. The buffered image data of the content may be image data reproducible after the certain time. As described above, operations S405 and S407 may be simultaneously performed by the sync terminal 200 during the certain time.

According to various embodiments of the present disclosure, the certain time for reproducing the content in the mirroring mode before being switched to the streaming mode may be determined based on a bandwidth of a network, a duration of the content, a size of the content data, a bit rate of the content reproduced in the mirroring mode, and/or the like. According to the determined certain time, the sync terminal 200 may determine whether to reproduce the content by switching from the mirroring mode to the streaming mode.

A method of determining the certain time and determining whether to reproduce the content by switching from the mirroring mode to the streaming mode will be described in detail below with reference to FIG. 7.

In addition, according to various embodiments of the present disclosure, the sync terminal 200 may receive and reproduce content data from an external device other than the source terminal 100, in which the content data is stored, in the streaming mode. If the content data is received from the external device, the sync terminal 200 may receive the content data from the external device based on the location information of the content, which may be included in the metadata of the content that is received at operation S401.

In this case, if the content is displayed on only a partial region of the screen of the source terminal 100, image data corresponding to a remaining region at which the content is not displayed is received from the source terminal 100, and content data for reproducing the content in the streaming mode may be received from the external device. However, content data to be reproduced in the mirroring mode during the certain time may be received from the source terminal 100 together with the image data corresponding to the remaining region at which the content is not displayed.

At operation 411, the sync terminal 200 may determine whether the certain time has passed.

If the sync terminal 200 determines that the certain time has not passed at operation 411, then the sync terminal 200 may return to operation 407.

If the sync terminal 200 determines that the certain time has passed at operation S411, then the sync terminal 200 may proceed to operation S413 at which the sync terminal 200 may reproduce the content in the streaming mode by using the image data buffered in the memory of the sync terminal 200.

If the sync terminal 200 reproduces the content in the streaming mode, then the sync terminal 200 may display a UI indicating that the content is being reproduced in the streaming mode on the screen of the sync terminal 200. In detail, if the content is reproduced in the mirroring mode, then the sync terminal 200 may display a UI indicating that the content is being reproduced in the mirroring mode on the screen of the sync terminal 200. In addition, if the sync terminal 200 reproduces the content in the mirroring mode during the certain time in order to reproduce the content in the streaming mode, then the sync terminal 200 may display a UI indicating that the content is being reproduced by switching from the mirroring mode to the streaming mode. For example, 'mirroring→streaming' may be displayed on an upper part of the screen of the sync terminal 200. Furthermore, if the content is reproduced in the streaming mode after the certain time, then the sync terminal 200 may display a UI indicating that the content is being reproduced in the streaming mode. In addition, like the screen of the sync terminal 200, the source terminal 100 may display a UI indicating that the content is being reproduced in the mirroring mode, that the content is being reproduced by switching from the mirroring mode to the streaming mode, or that the content is being reproduced in the streaming mode on the screen of the source terminal 100.

When the sync terminal 200 reproduces the content in the streaming mode, a certain size of content data to be reproduced after the currently displayed content may be previously stored in the memory. By continuously storing the certain size of the content data, although a network performance (e.g., a data reception speed), or decoding of the content data is temporarily low or delayed, the reproduction of the content may not be stopped. However, if a speed at which the sync terminal 200 receives the image data of the content is reduced and thus the content data stored in the memory does not exist (e.g., if underflow is generated), then the reproduction of the content may be stopped.

The underflow may be generated when the image data of the content is buffered. The underflow refers to a case that, when content data is received in a streaming mode, the content data buffered in a memory of a terminal for reproducing content in the streaming mode is insufficient and thus the terminal is not able to reproduce the content in the streaming mode. If the underflow is generated, then because it may be considered that a transmission speed of a network is excessively reduced and thus that original content data is not receivable, the sync terminal 200 may reproduce the content by switching from the streaming mode back to the mirroring mode.

For example, if the content data is received from the source terminal 100, then the transmission speed of the network between the sync terminal 200 and the source terminal 100 may be reduced and the underflow may be generated. In addition, if the content data stored in the external device is received via the source terminal 100 by the sync terminal 200, then the same phenomenon (e.g., underflow generation) may occur. In comparison to a case that the content is reproduced in the streaming mode, if the content is reproduced in the mirroring mode, then a time for buffering the content data or the size of the content data to be received may be reduced. For example, if the quality of image data reproduced in the mirroring mode is lower than the quality of image data reproduced in the streaming mode, then the time for buffering the content data or the size of the content data to be received may be reduced. Therefore, if the underflow is generated, then the sync terminal 200 may receive and reproduce the image data including the content and corresponding to the screen of the source terminal 100, from the source terminal 100.

At operation S415, the sync terminal 200 may determine whether underflow is detected.

If the sync terminal 200 detects that the underflow is generated in the sync terminal 200 at operation S415, then the sync terminal 200 may proceed to operation S417 at which the content may be reproduced in the mirroring mode.

While the content is reproduced in the mirroring mode at operation S417, the sync terminal 200 may determine again whether to reproduce the content by switching from the mirroring mode to the streaming mode at operation S405, and thus may reproduce the content by switching from the mirroring mode to the streaming mode at operations S407, S409, S411, and S413. In this case, whether to reproduce the content by switching from the mirroring mode to the streaming mode may be determined according to a user input or a method of determining whether to reproduce the content by switching from the mirroring mode to the streaming mode as described below with reference to FIG. 7.

If the sync terminal 200 determines that underflow is not detected (e.g., if the underflow is not generated) at operation S415, then the sync terminal 200 may proceed to operation S407. For example, the sync terminal 200 may reproduce the content in the streaming mode until the reproduction of the content is stopped or terminated.

Although one sync terminal 200 reproduces the content displayed on the screen of the source terminal 100 in the streaming mode or the mirroring mode in the above description, the sync terminal 200 is not limited thereto, and a plurality of sync terminals may exist. For example, the plurality of sync terminals may reproduce the content displayed on the screen of the source terminal 100 in the streaming mode or the mirroring mode. The plurality of sync terminals may receive the image data of the content to be reproduced in the streaming mode or the mirroring mode, from the source terminal 100 or the external device.

According to various embodiment of the present disclosure, the quality of the content reproduced in the mirroring mode may be determined according to a transmission speed of a network in which the sync terminal 200 receives the content data. For example, if the transmission speed of the network is increased, then the quality of the content reproduced in the mirroring mode may also be increased. However, the quality of the content reproduced in the mirroring mode is not limited thereto, and may be determined according to a user input or a preset value.

However, the quality of the content reproduced in the mirroring mode at operation S417 and the quality of the content reproduced in the mirroring mode at operation S407 may be determined as different values. In other words, the quality of the content reproduced at operation S417 may be determined according to the transmission speed of the network in which the sync terminal 200 receives the content data, but the quality of the content reproduced at operation S407 may be determined according to a factor other than the transmission speed.

For example, the quality of the content reproduced in the mirroring mode at operation S407 may not be determined according to the transmission speed of the network but may be determined as a preset minimized value. At operation S407, the sync terminal 200 may receive the content data in the mirroring mode and, at the same time, may receive the content data in the streaming mode. Therefore, the quality of the content reproduced in the mirroring mode at operation S407 may be determined to minimize a time for buffering the content data received in the streaming mode. In detail, the quality of the content reproduced in the mirroring mode at operation S407 may be set as a value for minimizing the size of the content data received by the sync terminal 200 in the mirroring mode. The quality of the content reproduced in the mirroring mode may be set as a value for minimizing the size of the content data received by the sync terminal 200 in the mirroring mode because the size of the content data may be reduced if the quality of the content is reduced. In addition, the quality of the content reproduced in the mirroring mode may be set as a value for minimizing the size of the content data received by the sync terminal 200 in the mirroring mode because, in order to receive the content data to be reproduced in the streaming mode at a higher speed by using a limited bandwidth of the network and thus to minimize the time for buffering the content data, reducing the size of the content data to be reproduced in the mirroring mode may be appropriate. In this case, the quality of the content reproduced in the mirroring mode at operation S407 may be set as a preset value.

Methods of reproducing content with respect to the source terminal 100, according to various embodiments of the present disclosure, will now be described with reference to FIGS. 5 and 6.

Figure 5:
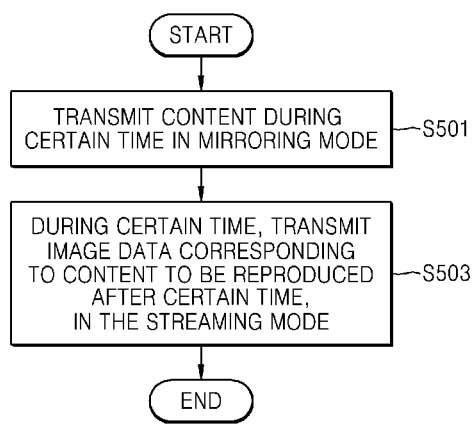
FIGS. 5 and 6 are flowcharts of a method of reproducing content with respect to a source terminal, according to embodiments of the present disclosure.

FIG. 5 is a flowchart of a method of reproducing content with respect to a source terminal, according to an embodiment of the present disclosure.

Referring to FIG. 5, at operation S501, the source terminal 100 may transmit content during a certain time in a mirroring mode. For example, in order to allow the sync terminal 200 to display content displayed on a screen of the source terminal 100, the source terminal 100 may transmit the content during a certain time in a mirroring mode. In this case, the sync terminal 200 may receive and reproduce content data from the source terminal 100 in the mirroring mode.

The content displayed on a screen of the sync terminal 200 may be a screen displayed on a partial region of the screen of the source terminal 100. The source terminal 100 may transmit image data corresponding to a certain region of the screen of the source terminal 100, as data to be reproduced in a streaming mode. In addition, the source terminal 100 may transmit image data corresponding to a remaining region of the screen of the source terminal 100 other than the certain region, as data to be reproduced in the mirroring mode.

At operation S503, during the certain time, the source terminal 100 may transmit image data corresponding to the content to be reproduced after the certain time, to the sync terminal 200 in the streaming mode. Because the sync terminal 200 may receive and reproduce original content data, the quality of the content reproduced by the sync terminal 200 may not be reduced.

After the certain time, the source terminal 100 may transmit the content to the sync terminal 200 in the streaming mode until the reproduction of the content displayed on the source terminal 100 is stopped or terminated.

Figure 6:
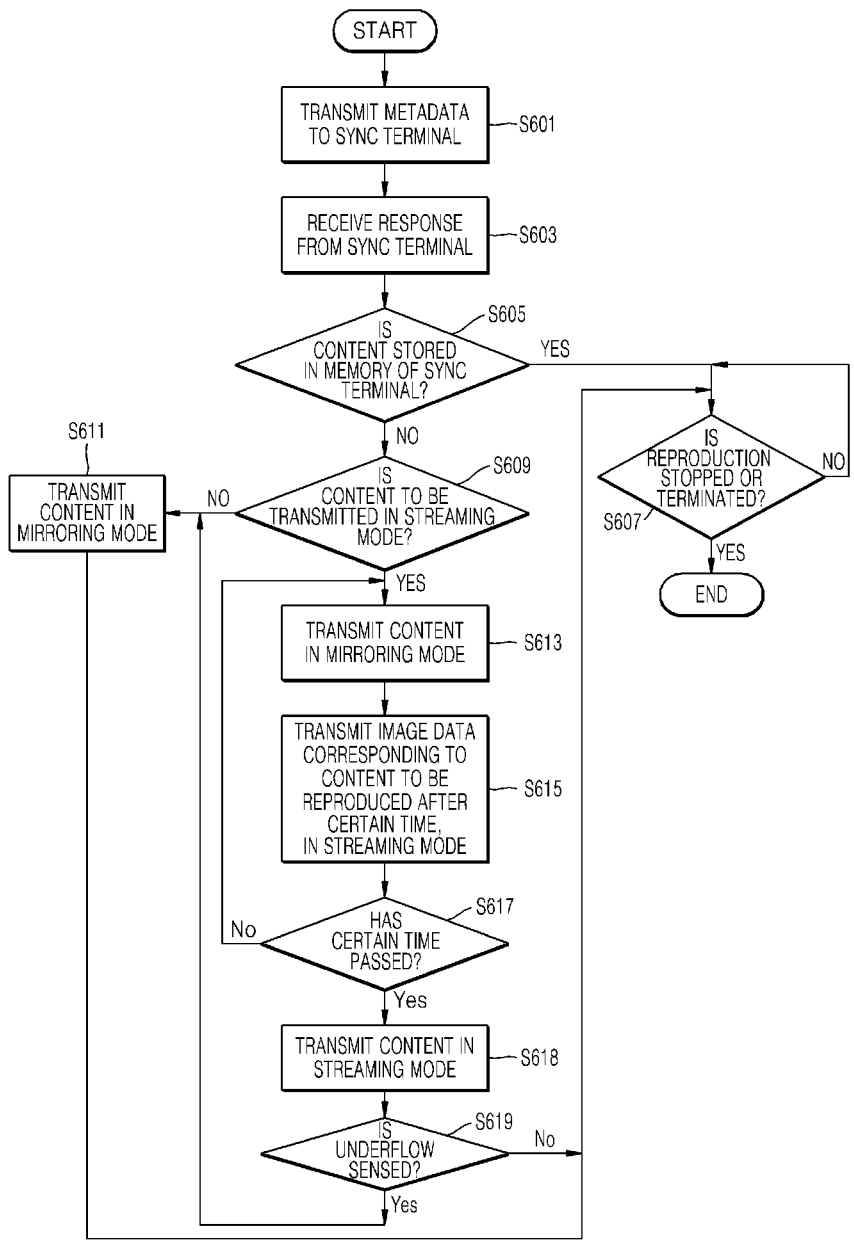

FIG. 6 is a flowchart of a method of reproducing content with respect to a source terminal, according to an embodiment of the present disclosure.

Operations S501 and S503 of FIG. 5 correspond to operations S613 and S615 of FIG. 6, and repeated descriptions thereof are not provided.

In contrast to the method illustrated in FIG. 5, in the method illustrated in FIG. 6, content data may be transmitted to the sync terminal 200 according to whether content data displayed on a screen of the source terminal 100 is stored in the sync terminal 200.

Referring to FIG. 6, at operation S601, the source terminal 100 may transmit metadata of content displayed on the screen of the source terminal 100, to the sync terminal 200.

The metadata of the content may include information about the content (e.g., location information of the content such as a URL address, a size of the content data, a creation date of the content, a frame rate, a bit rate, a duration, and/or the like. If screen mirroring is performed and content is displayed on the screen of the source terminal 100, then the source terminal 100 may obtain and transmit metadata of the displayed content to the sync terminal 200.

At operation S603, the source terminal 100 may receive a response regarding the metadata of the content, which is transmitted at operation S601, from the sync terminal 200. Based on the response received from the sync terminal 200 at operation S603, the source terminal 100 may determine whether to transmit the content data to the sync terminal 200.

At operation S605, based on the response received at operation S603, the source terminal 100 may determine whether the content displayed on the screen of the source terminal 100 is stored in a memory of the sync terminal 200.

If the source terminal 100 determines that the content displayed and reproduced on the screen of the source terminal 100 is stored in the memory of the sync terminal 200 at operation S605, then the sync terminal 200 may obtain the content data displayed on the screen of the source terminal 100, from the memory of the sync terminal 200, and may reproduce the content by using the obtained content data. Thereafter, the source terminal 100 proceeds to operation S607.

At operation S607, the source terminal 100 may determine whether reproduction is stopped or terminated.

If the source terminal 100 determines that the reproduction is not stopped or terminated at operation S607, then source terminal may return to operation S607 and continue to poll for determination that the reproduction is stopped or terminated. For example, source terminal 100 may allow the content to be reproduced by using the content data obtained from the memory of the sync terminal 200, until the reproduction of the content displayed on the source terminal 100 is stopped or terminated at operation S607.

If the source terminal 100 determines that the reproduction of the content displayed on the source terminal 100 is stopped or terminated at operation S607, then the source terminal 100 may transmit a message indicating that the reproduction of the content is stopped or terminated, to the sync terminal 200. The sync terminal 200 may stop or terminate the reproduction of the content according to the message received from the source terminal 100.

In addition to the memory of the sync terminal 200, the sync terminal 200 may reproduce the content by using the content data stored in a memory of a peripheral device of the sync terminal 200.

The content data may be received from the peripheral device or the source terminal 100 by determining whether receiving the content data from the peripheral device of the sync terminal 200 is more appropriate than receiving the content data from the source terminal 100. For example, if a communication speed between the peripheral device and the sync terminal 200 is higher than the communication speed between the source terminal 100 and the sync terminal 200, then the sync terminal 200 may receive and reproduce the content data from the peripheral device.

If the source terminal 100 determines that the content displayed and reproduced on the screen of the source terminal 100 is not stored in the memory of the sync terminal 200 at operation S605, then the source terminal may proceed to operation S609.

At operation S609, the source terminal 100 may determine whether the content is to be transmitted in the streaming mode. For example, the source terminal 100 may determine whether to reproduce the content displayed on the screen of the source terminal 100, on the sync terminal 200 in a mirroring mode or a streaming mode. For example, the source terminal 100 may transmit the content in the mirroring mode during a certain time and, during the certain time, may determine whether to transmit the content to be reproduced after the certain time, in the streaming mode.

If the source terminal 100 determines to reproduce the content in the mirroring mode instead of the streaming mode at operation S609, then the source terminal 100 may proceed to operation S611 at which the source terminal 100 may transmit the content in the mirroring mode. If the source terminal 100 transmits the content in the mirroring mode, then the source terminal 100 a UI indicating that the content is being transmitted in the mirroring mode may be displayed on the screen of the source terminal 100.

The source terminal 100 may transmit the content in the mirroring mode until the reproduction of the content is stopped or terminated at operation S607 according to a user input or a duration of the content.

If the source terminal 100 determines to reproduce the content in the streaming mode at operation S609, then the source terminal 100 may proceed to operation S613.

At operation S613, the source terminal 100 may transmit the content to the sync terminal 200 in the mirroring mode.

At operation S615, during the certain time, the source terminal 100 may transmit image data corresponding to the content to be reproduced after the certain time, to the sync terminal 200 in the streaming mode.

The sync terminal 200 may buffer the received image data during the certain time, and may reproduce the content by using the buffered image data after the certain time. As described above, operations S613 and S615 may be simultaneously performed by the source terminal 100 during the certain time.

At operation S618, the source terminal 100 may determine whether the certain time has passed. The source terminal 100 may transmit the content in the mirroring mode and the streaming mode until the certain time has passed at operation S617.

If the source terminal 100 determines that the certain time has not passed at operation S618, then the source terminal 100 may return to operation S613.

If the source terminal 100 determines that the certain time has passed (e.g., after the certain time has passed) at operation S617, then the source terminal 100 may proceed to operation S618 at which the source terminal 100 may transmit the content not in the mirroring mode but in the streaming mode.

Therefore, according to various embodiments of the present disclosure, when the content starts to be transmitted in the streaming mode, the source terminal 100 may also transmit the content in the mirroring mode during the certain time. In addition, during the certain time for buffering the content received in the streaming mode, the sync terminal 200 may reproduce the content in the mirroring mode. For example, the sync terminal 200 may reproduce and display the content during the certain time for buffering the content in order to reproduce the content in the streaming mode.

At operation S619, the source terminal 100 may determine whether underflow is detected.

If the source terminal 100 determines that underflow is not detected at operation S619, then the source terminal 100 may proceed to operation S607.

If the source terminal 100 determines that underflow is detected (e.g., if the source terminal 100 detects that underflow is generated) at operation S619 as described above in relation to the sync terminal 200, then the source terminal 100 may proceed to operation S611 at which the source terminal 100 may transmit the content in the mirroring mode. The source terminal 100 may detect that the underflow is generated, by receiving a message indicating that that the underflow is generated, from the sync terminal 200.

If the underflow is generated, because a transmission speed of a network may be considered to be excessively reduced and because original content data is not receivable, the source terminal 100 may transmit the content by switching from the streaming mode to the mirroring mode.

While the content is transmitted in the mirroring mode at operation S611, the source terminal 100 may determine again whether to transmit the content by switching from the mirroring mode to the streaming mode at operation S609, and thus may transmit the content by switching from the mirroring mode to the streaming mode at operations S613, S615, S617, and S618.

If the underflow is not generated in operation S619, the source terminal 100 may transmit the content in the streaming mode until the reproduction of the content is stopped or terminated.

Figure 7:
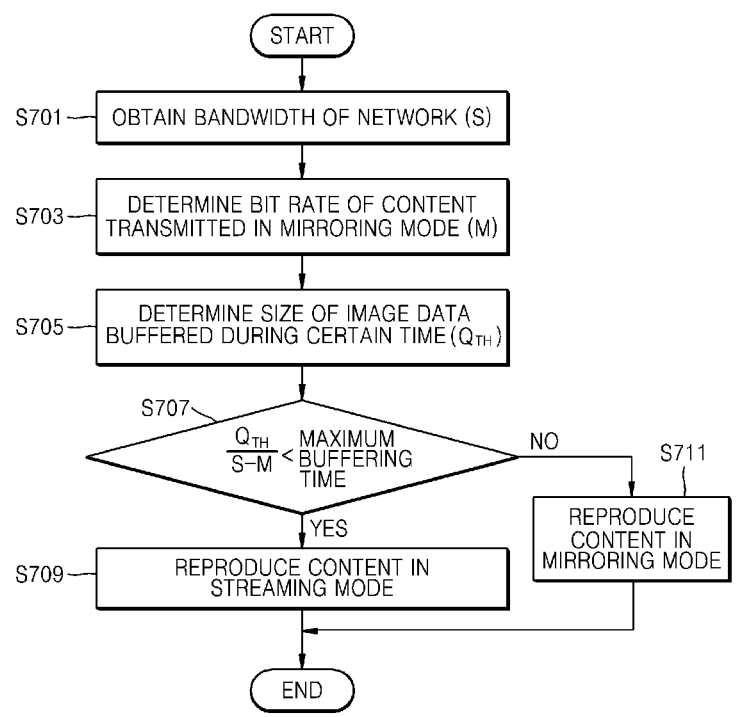
FIG. 7 is a flowchart of a method of determining whether to reproduce content in a streaming mode, according to an embodiment of the present disclosure.

FIG. 7 is a flowchart of a method of determining whether to reproduce content in a streaming mode, according to an embodiment of the present disclosure.

According to various embodiments of the present disclosure, the sync terminal 200, the source terminal 100, or an external device may determine whether to reproduce the content in the streaming mode. However, for convenience of explanation, in the following description, the source terminal 100 may be assumed to perform the determining whether to reproduce the content in the streaming mode.

Referring to FIG. 7, at operation S701, the source terminal 100 obtains a bandwidth S of a network. For example, in order to determine whether to transmit the content to the sync terminal 200 in the streaming mode, the source terminal 100 may obtain a bandwidth S of a network used between the source terminal 100 and the sync terminal 200.

The bandwidth S of the network may refer to the amount of data transmittable and receivable per unit of time between devices connected via the network. Therefore, if the bandwidth S of the network is increased, the amount of data transmittable per unit time may also be increased.

At operation S703, the source terminal 100 may determine a bit rate M of the content transmitted in a mirroring mode.

The bit rate M of the content transmitted in the mirroring mode may correspond to the quality of the content displayed when the content is reproduced in the mirroring mode by using content data received from the sync terminal 200 in the mirroring mode. For example, according to the bit rate M, the quality of the content displayed when the sync terminal 200 reproduces the content in the mirroring mode may be determined. In addition, if the bit rate M is reduced, the amount of the content data transmitted in the mirroring mode may also be reduced.

Therefore, the bit rate M of the content transmitted in the mirroring mode may be set to be low in order to achieve a large data size of the content transmitted in the streaming mode per unit of time. For example, because the amount of data (S) transmittable per unit time is limited according to a network performance, the bit rate M of the content transmitted in the mirroring mode may be set to be low in such a way that a large amount of data of the content may be transmitted in the streaming mode per unit time.

At operation S705, the source terminal 100 may obtain a size $Q_{TH}$ of image data buffered during a certain time.

The size $Q_{TH}$ of the buffered image data refers to a size of minimum data that should be buffered in the sync terminal 200. For example, the sync terminal 200 may receive content data corresponding to the size $Q_{TH}$ of the minimum data that should be buffered, and then may reproduce the content in the streaming mode by using the received content data. In other words, the sync terminal 200 may reproduce the content after the content data corresponding to the size $Q_{TH}$ of the minimum data that should be buffered is received.

According to various embodiments of the present disclosure, the size $Q_{TH}$ of the buffered image data may be determined based on information about the content or the network (e.g., the bandwidth S of the network, a duration of the content, a size of the content data, a bit rate of the content data, and/or the like). However, the size $Q_{TH}$ of the buffered image data is not limited thereto and may be determined according to various factors or methods.

At operation S707, the source terminal 100 may determine whether to transmit the content by switching from the mirroring mode to the streaming mode. For example, the source terminal 100 may determine whether to transmit the content by switching from the mirroring mode to the streaming mode based on the bandwidth S of the network, the bit rate M of the content transmitted in the mirroring mode, and the size $Q_{TH}$ of the image data buffered during the certain time, which are respectively obtained at operations S701, S703, and S705. Operation S707 of FIG. 7 may correspond to operation S405 of FIG. 4 or operation S609 of FIG. 6.

For example, the source terminal 100 may determine whether to transmit the content by switching from the mirroring mode to the streaming mode according to whether a value of $Q_{TH}/(S-M)$ is less than a maximum buffering time. The value of $Q_{TH}/(S-M)$ is obtained by dividing a size (S−M) of content data transmittable in the streaming mode per unit of time by the size $Q_{TH}$ of the buffered image data, and thus may refer to a time for transmitting the content data by the size $Q_{TH}$ in the streaming mode.

The value of $Q_{TH}/(S-M)$ may correspond to the above-described certain time for transmitting or reproducing the content in the mirroring mode.

During the certain time, because the content is reproduced in the mirroring mode, in contrast to a case according to which content is reproduced in the streaming mode, the content may be reproduced with a lower quality. In addition, as described above, during the certain time, in order to increase the size (S−M) of the content data transmitted in the streaming mode, the quality of the content reproduced in the mirroring mode may be set to be lower in comparison to the quality of the content reproduced in a general mirroring mode. For example, the value of M may be set to be lower.

Whether to transmit the content by switching from the mirroring mode to the streaming mode may be determined according to whether a time for reproducing the content with a lower quality in comparison to the quality of the content reproduced in the general mirroring mode (e.g., the certain time), is less than a preset maximum buffering time. If the certain time corresponds to the duration of the content, then a time for reproducing the content in the streaming mode may be excessively short, and thus the maximum buffering time may be determined according to the duration of the content.

For example, if the duration of the content is 30 sec. and the certain time obtained based on $Q_{TH}/(S-M)$ is 25 sec., then the content may be reproduced with a lower quality in comparison to the quality of the content reproduced in the general mirroring mode during 25 sec. In addition, the content may be reproduced in the streaming mode during only 5 sec. Therefore, the sync terminal 200 may be set to reproduce the content in the general mirroring mode without switching from the mirroring mode to the streaming mode, if the certain time is equal to or greater than 10 sec.

In addition, the maximum buffering time may be determined according to a user input.

According to various embodiments of the present disclosure, the source terminal 100 may determine the value of M by using the preset maximum buffering time as the certain time. In other words, the value of M may be determined to satisfy $Q_{TH}/(S-M)$=Maximum Buffering Time. Therefore, if the maximum buffering time is reduced, the value of M may also be reduced. In this case, the maximum buffering time may be determined according to the duration of the content or a user input.

Furthermore, while the source terminal 100 transmits the content in the mirroring mode in operation S417, if it is determined whether to transmit the content by switching from the mirroring mode to the streaming mode, the maximum buffering time may be determined in consideration of a remaining duration of the content. For example, if the remaining duration of the content is 30 sec. and the certain time obtained based on $Q_{TH}/(S-M)$ is 25 sec., the content may be reproduced with a lower quality in comparison to the quality of the content reproduced in the general mirroring mode during 25 sec. In addition, the content may be reproduced in the streaming mode during only 5 sec. Therefore, the sync terminal 200 may be set to reproduce the content in the general mirroring mode without switching from the mirroring mode to the streaming mode, if the certain time is equal to or greater than 10 sec.

If the source terminal 100 determines to transmit the content by switching from the mirroring mode to the streaming mode (e.g., if $Q_{TH}/(S-M)$<Maximum Buffering Time), then the procedure may proceed to operation S709. For example, if the time for reproducing the content in the mirroring mode on the sync terminal 200 (e.g., the certain time), is less than the preset maximum buffering time, then the procedure may proceed to operation S709. At operation S709, the source terminal 100 may transmit the content by switching from the mirroring mode to the streaming mode.

In contrast, if the source terminal 100 determines not to transmit the content by switching from the mirroring mode to the streaming mode (e.g., if $Q_{TH}/(S-M)$≥Maximum Buffering Time), then the procedure may proceed to operation S711. For example, if the certain time is equal to or greater than the preset maximum buffering time, the procedure may proceed to operation S711. At operation S711, the source terminal 100 may transmit the content so as to be reproduced in the mirroring mode.

Figure 8:
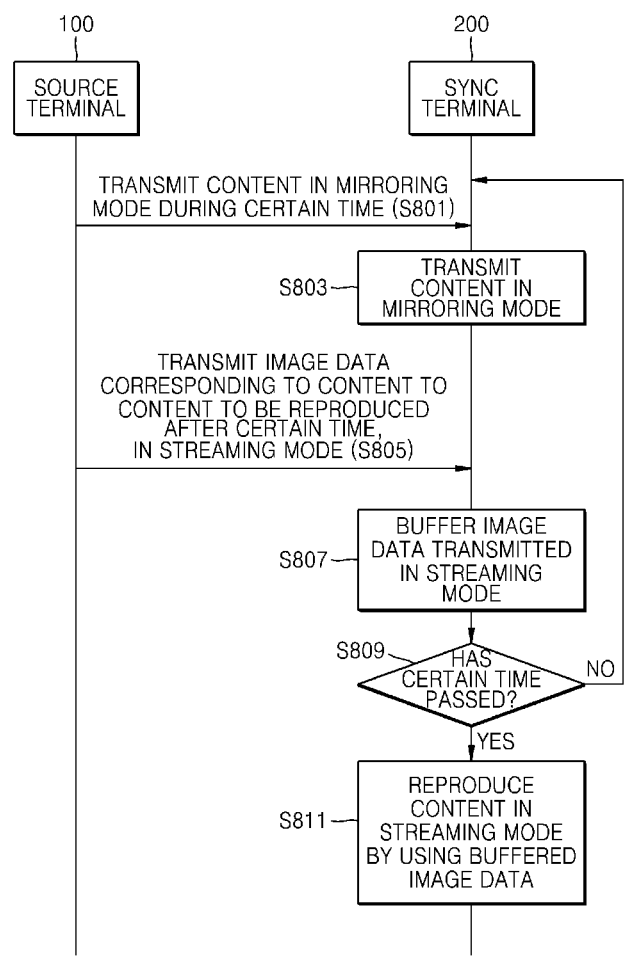
FIG. 8 is a flowchart of a method of reproducing content, according to an embodiment of the present disclosure.

FIG. 8 is a flowchart of a method of reproducing content, according to an embodiment of the present disclosure.

Referring to FIG. 8, at operation S801, the source terminal 100 may transmit the content in a mirroring mode during a certain time. In this case, because content data should be transmitted in the mirroring mode and the streaming mode during the certain time, the content data transmitted in the mirroring mode may have a lower bit rate in comparison to a case when the content data is transmitted only in the mirroring mode. As described above in relation to FIG. 7, the source terminal 100 may transmit the content in the streaming mode according to whether the certain time for buffering the content data transmitted in the streaming mode is less than a preset maximum buffering time.

At operation S803, the sync terminal 200 may reproduce the content in the mirroring mode during the certain time by using the content data received at operation S801.

At operation S805, during the certain time, the source terminal 100 may transmit image data corresponding to the content to be reproduced in the streaming mode after the certain time.

At operation S807, the sync terminal 200 may buffer the image data transmitted at operation S805, in a memory during the certain time.

At operation S809, the sync terminal 200 may determine whether the certain time has passed.

If the sync terminal 200 determines that the certain time has not passed at operation S809, then process may return to operation S801.

If the sync terminal 200 determines that the certain time has passed at operation S809, then the sync terminal may proceed to operation S811 at which the sync terminal 200 may reproduce the content in the streaming mode by using the image data buffered at operation S807. For example, the sync terminal 200 may reproduce the content in the mirroring mode during the certain time, and may reproduce the content in the streaming mode after the certain time.

Internal structures of the above-described source terminal 100 and the sync terminal 200 will now be described in detail with reference to FIGS. 9A and 9B, and 10A and 10B.

Figure 9A:
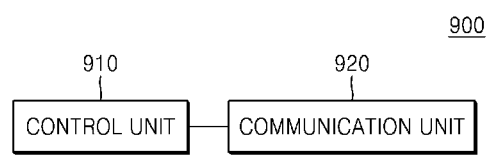
FIGS. 9A and 9B are block diagrams of a source terminal according to embodiments of the present disclosure.
Figure 9B:
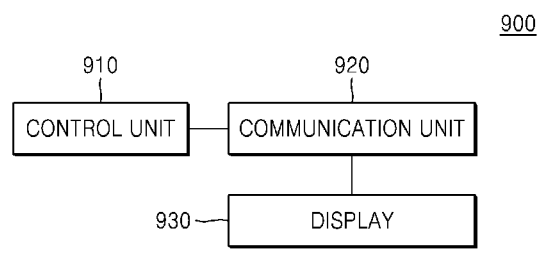

FIGS. 9A and 9B are block diagrams of a source terminal according to embodiments of the present disclosure.

Referring to FIGS. 9A and 9B, the source terminal 900 corresponds to the source terminal 100 of FIG. 1, and repeated descriptions thereof are not provided here.

Referring to FIG. 9A, the source terminal 900 may include a control unit 910 and a communication unit 920. However, all illustrated elements are not essential. The source terminal 900 may further include other elements in addition to the illustrated elements, or may not include some of the illustrated elements.

The control unit 910 may generally control overall operations of the source terminal 900. For example, the control unit 910 may control the communication unit 920 to transmit content of the source terminal 900 in a mirroring mode or a streaming mode. For example, the control unit 910 may control overall operations of the communication unit 920.

According to various embodiments of the present disclosure, the control unit 910 may control the communication unit 920 to transmit image data corresponding to the content in the mirroring mode during a certain time, to transmit image data corresponding to the content to be reproduced after the certain time, in the streaming mode during the certain time, and to transmit the image data corresponding to the content in the streaming mode after the certain time.

In addition, according to various embodiments of the present disclosure, while the content is transmitted in the streaming mode, if generation of underflow in a sync terminal 1000 is detected (see FIGS. 10A and 10B), then the control unit 910 may control the source terminal 900 to transmit the image data corresponding to the content in the mirroring mode.

The communication unit 920 may include one or more elements for communications between the source terminal 900 and one or more sync terminals 1000, or between the source terminal 900 and an external device. For example, the communication unit 920 may include a mobile communication module, a wireless Internet module, a wired Internet module, a short-range communication module, and/or the like.

The mobile communication module transmits and receives wireless signals to and from at least one of a base station, an external terminal, and a server in a mobile communication network. The wireless signals may include various types of data according to transmission and reception of a voice call signal, a video call signal, a text/multimedia message, and/or the like.

The wireless Internet module refers to a module for wireless Internet access, and may be embedded or may be connected as an external module. In addition, the wired Internet module refers to a module for wired Internet access.

The short-range communication module refers to a module for short-range communications. The short-range communication module may communicate using a short-range communication technology such as Bluetooth, Radio Frequency Identification (RFID), Infrared Data Association (IrDA), Ultra Wideband (UWB), ZigBee, Wi-Fi Direct (WFD), Near Field Communication (NFC), and/or the like.

According to various embodiments of the present disclosure, the communication unit 920 may transmit the image data corresponding to the content to the sync terminal 1000 via a certain network.

Referring to FIG. 9B, the source terminal 900 may include a control unit 910, a communication unit 920, and a display 930. The control unit 910 and the communication unit 920 of FIG. 9A correspond to the control unit 910 and the communication unit 920 of FIG. 9B, and repeated descriptions thereof are not provided.

The display 930 may display and output data processed by the source terminal 900. For example, the display 930 may display a UI or a Graphical User Interface (GUI) for executing an application in the source terminal 900, or the content being reproduced by the source terminal 900 or an external device.

If the display 930 forms a layered structure together with a touch pad and thus forms a touch screen, the display 930 may be used as an input device as well as an output device. The display 930 may include at least one of a Liquid Crystal Display (LCD), a Thin Film Transistor-Liquid Crystal Display (TFT-LCD), an Organic Light-Emitting Diode (OLED), a flexible display, a Three-Dimensional (3D) display, and/or the like. Two or more displays 930 may exist according to a design of the source terminal 900. The touch screen may be configured to detect the pressure of a touch input as well as the location of a touch input and a touched area. In addition, the touch screen may be configured to detect a proximity touch as well as a real touch.

According to various embodiments of the present disclosure, a screen of the source terminal 900 may be a screen displayed on the display 930. However, the screen of the source terminal 900 is not limited thereto and may be a screen displayed on an external device other than the source terminal 900.

According to various embodiments of the present disclosure, the display 930 may display content reproduced by the source terminal 900.

Figure 10A:
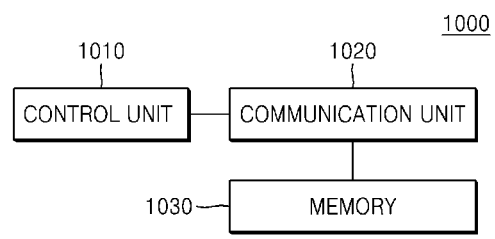
FIGS. 10A and 10B are block diagrams of a sync terminal according to embodiments of the present disclosure.
Figure 10B:
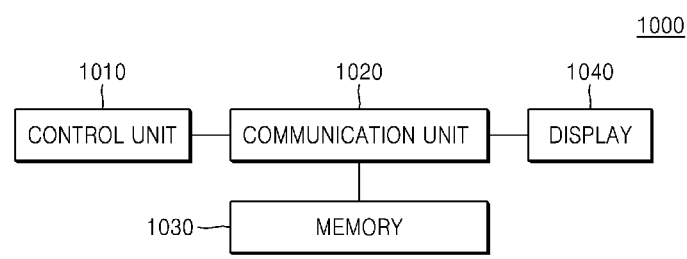

FIGS. 10A and 10B are block diagrams of a sync terminal according to embodiments of the present disclosure.

Referring to FIGS. 10A and 10B, the sync terminal 1000 corresponds to the sync terminal 200 of FIG. 1, and repeated descriptions thereof are not provided.

Referring to FIG. 10A, the sync terminal 1000 may include a control unit 1010, a communication unit 1020, and a memory 1030. However, all illustrated elements are not essential. The sync terminal 1000 may further include other elements in addition to the illustrated elements, or may not include some of the illustrated elements.

The control unit 1010 may generally control overall operations of the sync terminal 1000. For example, the control unit 1010 may control the communication unit 1020 to receive content data for reproducing content of the sync terminal 1000 in a mirroring mode or a streaming mode, from the source terminal 900 or an external device. For example, the control unit 1010 may control overall operations of the communication unit 1020.

According to various embodiments of the present disclosure, the control unit 1010 may control the sync terminal 1000 to reproduce the content in the mirroring mode during a certain time, and to reproduce the content in the streaming mode after the certain time.

In addition, according to various embodiments of the present disclosure, while the content is reproduced in the streaming mode, the control unit 1010 may detect that underflow is generated in the sync terminal 1000 and thus may control the sync terminal 1000 to reproduce the content in the mirroring mode.

The communication unit 1020 may include one or more elements for communication between the sync terminal 1000 and the source terminal 900, or for communication between the sync terminal 1000 and an external device. For example, the communication unit 1020 may include a mobile communication module, a wireless Internet module, a wired Internet module, a short-range communication module, and/or the like.

The mobile communication module transmits and receives wireless signals to and from at least one of a base station, an external terminal, and a server in a mobile communication network. The wireless signals may include various types of data according to transmission and reception of a voice call signal, a video call signal, a text/multimedia message, and/or the like.

The wireless Internet module refers to a module for wireless Internet access, and may be embedded or may be connected as an external module. In addition, the wired Internet module refers to a module for wired Internet access.

The short-range communication module refers to a module for short-range communications. The short-range communication module may communicate using a short-range communication technology, for example, Bluetooth, RFID, IrDA, UWB, ZigBee, WFD, NFC, and/or the like.

According to various embodiments of the present disclosure, in order to reproduce certain content, the communication unit 1020 may receive the content from the source terminal 900 via a certain network.

The memory 1030 may store programs for processing and controlling of the control unit 1010, and may perform functions for storing input/output data (e.g., image data of the content, and image data corresponding to a screen region displayed on the source terminal 900).

According to various embodiments of the present disclosure, during a certain time, the memory 1030 may buffer image data corresponding to the content to be reproduced after the certain time.

The memory 1030 may include at least one storage medium from among flash memory, a hard disk, a multimedia card micro, a card type memory (e.g., SD or XD memory), Random-Access Memory (RAM), Static Random-Access Memory (SRAM), Read-Only Memory (ROM), Electrically Erasable Programmable Read-Only Memory (EEPROM), Programmable Read-Only Memory (PROM), magnetic memory, a magnetic disk, an optical disk, and/or the like. In addition, the sync terminal 1000 may operate web storage for performing the storing function of the memory 1030 on the Internet.

Referring to FIG. 10B, the sync terminal 1000 may include a control unit 1010, a communication unit 1020, a memory 1030, and a display 1040.

The display 1040 may display and output data processed by the sync terminal 1000. For example, the display 1040 may display a UI or a GUI for executing an application in the sync terminal 1000. In addition, the display 1040 may display the content reproduced in the mirroring mode or the streaming mode by using data received from the source terminal 900 or an external device.

If the display 1040 forms a layered structure together with a touch pad and thus forms a touch screen, the display 1040 may be used as an input device as well as an output device. The display 1040 may include at least one of a liquid crystal display, a thin film transistor-liquid crystal display, an organic light-emitting diode, a flexible display, a 3D display, and/or the like. Two or more displays 1040 may exist according to a design of the sync terminal 1000. The touch screen may be configured to detect the pressure of a touch input as well as the location of a touch input and a touched area. In addition, the touch screen may be configured to detect a proximity touch as well as a real touch.

According to various embodiments of the present disclosure, a screen of the sync terminal 1000 may be a screen displayed on the display 1040. However, the screen of the sync terminal 1000 is not limited thereto and may be a screen displayed on an external device other than the sync terminal 1000.

According to various embodiments of the present disclosure, the display 1040 may display the content reproduced by the sync terminal 1000, or may display a screen of the source terminal 900 by using screen data received from the source terminal 900.

As described above, according to various embodiments of the present disclosure, a sync terminal may display content displayed on a source terminal, with a high quality.

According to various embodiments of the present disclosure, the sync terminal may stream and receive encoded content data from the source terminal and thus unnecessary resource and power consumption may be reduced.

It will be appreciated that various embodiments of the present disclosure according to the claims and description in the specification can be realized in the form of hardware, software or a combination of hardware and software.

Any such software may be stored in a non-transitory computer readable storage medium. The non-transitory computer readable storage medium stores one or more programs (software modules), the one or more programs comprising instructions, which when executed by one or more processors in an electronic device, cause the electronic device to perform a method of the present disclosure.

Any such software may be stored in the form of volatile or non-volatile storage such as, for example, a storage device like a Read Only Memory (ROM), whether erasable or rewritable or not, or in the form of memory such as, for example, Random Access Memory (RAM), memory chips, device or integrated circuits or on an optically or magnetically readable medium such as, for example, a Compact Disk (CD), Digital Versatile Disc (DVD), magnetic disk or magnetic tape or the like. It will be appreciated that the storage devices and storage media are various embodiments of non-transitory machine-readable storage that are suitable for storing a program or programs comprising instructions that, when executed, implement various embodiments of the present disclosure. Accordingly, various embodiments provide a program comprising code for implementing apparatus or a method as claimed in any one of the claims of this specification and a non-transitory machine-readable storage storing such a program.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method of reproducing content, the method comprising:
   when a sync terminal reproduces content by receiving the content from a source terminal via a certain network, reproducing the content in a mirroring mode during a certain time;
   buffering image data corresponding to the content to be reproduced after the certain time, during the certain time; and
   reproducing the content in a streaming mode after the certain time by using the buffered image data.

2. The method of claim 1, wherein the certain time is determined based on at least one of a duration of the content, a size of the buffered image data during the certain time, a bandwidth of the certain network, and a bit rate of image data reproduced in the mirroring mode.

3. The method of claim 1, further comprising:
   obtaining at least one of a duration of the content, a size of the buffered image data during the certain time, a bit rate of the image data reproduced in the mirroring mode, and a bandwidth of the certain network;
   determining the certain time based on the obtained the at least one of the duration of the content, the size of the buffered image data during the certain time, the bit rate of the image data reproduced in the mirroring mode, and the bandwidth of the certain network;
   comparing the determined certain time to a preset maximum buffering time; and
   determining whether to reproduce the content in the streaming mode, according to a result of the comparing of the determined certain time to the preset maximum buffering time.

4. The method of claim 1,
   wherein the reproducing of the content comprises reproducing image data corresponding to a certain region of a screen of the source terminal, and
   wherein the method further comprises:
   receiving the image data corresponding to the certain region, as data to be reproduced in the streaming mode; and
   receiving image data corresponding to a remaining region of the screen of the source terminal other than the certain region, as data to be reproduced in the mirroring mode.

5. The method of claim 1, further comprising:
   while the content is reproduced in the streaming mode, detecting that underflow is generated; and
   reproducing the content in the mirroring mode if generation of underflow is detected.

6. The method of claim 1, further comprising:
   receiving metadata of the content from the source terminal;
   obtaining the content from a memory of the sync terminal based on the received metadata; and
   reproducing the content by using the obtained content.

7. A method of reproducing content, the method comprising:
   when a source terminal transmits content to a sync terminal via a certain network,
   transmitting the content in a mirroring mode during a certain time; and
   transmitting image data corresponding to the content to be reproduced after the certain time, in a streaming mode during the certain time.

8. The method of claim 7, wherein the certain time is determined based on at least one of a duration of the content, a size of image data buffered during the certain time, a bandwidth of the certain network, and a bit rate of image data reproduced in the mirroring mode.

9. The method of claim 7, further comprising:
   obtaining at least one of a duration of the content, a size of image data buffered during the certain time, a bit rate of the image data reproduced in the mirroring mode, and a bandwidth of the certain network;
   determining the certain time based on the obtained the at least one of the duration of the content, the size of the image data buffered during the certain time, the bit rate of the image data reproduced in the mirroring mode, and the bandwidth of the certain network;
   comparing the determined certain time to a preset maximum buffering time; and determining whether to transmit the content in the streaming mode, according to a result of the comparing of the determined certain time to the preset maximum buffering time.

10. The method of claim 7,
wherein the transmitting of the content comprises transmitting image data corresponding to a certain region of a screen of the source terminal, to the sync terminal, and
wherein the method further comprises transmitting image data corresponding to a remaining region of the screen of the source terminal other than the certain region, as data to be reproduced in the mirroring mode.

11. The method of claim 7, further comprising:
while the content is transmitted in the streaming mode, detecting that underflow is generated in the sync terminal; and
transmitting the content in the mirroring mode if generation of underflow is detected.

12. The method of claim 7, further comprising:
transmitting metadata of the content to the sync terminal;
receiving a response regarding the transmitted metadata from the sync terminal;
determining whether the content is stored in the sync terminal, according to the received response; and
transmitting the content according to a result of the determining whether the content is stored in the sync terminal.

13. A sync terminal comprising:
a transceiver configured to receive content from a source terminal via a certain network in order to reproduce the content;
a controller configured to:
control the content to be reproduced in a mirroring mode during a certain time, and
control the content to be reproduced in a streaming mode after the certain time; and
a memory configured to buffer image data corresponding to the content to be reproduced after the certain time, during the certain time.

14. The sync terminal of claim 13, wherein the certain time is determined based on at least one of a duration of the content, a size of the image data buffered during the certain time, a bandwidth of the certain network, and a bit rate of image data reproduced in the mirroring mode.

15. The sync terminal of claim 13, wherein the controller is further configured to:
obtain at least one of a duration of the content, a size of the buffered image data during the certain time, a bit rate of the image data reproduced in the mirroring mode, and a bandwidth of the certain network,
determine the certain time based on the obtained at least one of the duration of the content, the size of the buffered image data during the certain time, the bit rate of the image data reproduced in the mirroring mode, and the bandwidth of the certain network,
compare the determined certain time to a preset maximum buffering time, and determine whether to reproduce the content in the streaming mode, according to a result of the comparing of the determined certain time to the preset maximum buffering time.

16. The sync terminal of claim 13, wherein the controller is further configured to:
detect, while the content is reproduced in the streaming mode, that underflow is generated, and
reproduce the content in the mirroring mode if generation of underflow is detected.

17. A source terminal comprising:
a transceiver configured to transmit content to a sync terminal via a certain network; and
a controller configured to:
control the content to be transmitted in a mirroring mode during a certain time,
control image data corresponding to the content to be reproduced after the certain time, to be transmitted in a streaming mode, during the certain time, and
control the image data corresponding to the content, to be transmitted in the streaming mode after the certain time.

18. The source terminal of claim 17, wherein the controller is further configured to:
obtain at least one of a duration of the content, a size of the buffered image data during the certain time, a bit rate of the image data reproduced in the mirroring mode, and a bandwidth of the certain network,
determine the certain time based on the at least one of the obtained duration of the content, the size of the image data buffered during the certain time, the bit rate of the image data reproduced in the mirroring mode, and the bandwidth of the certain network,
compare the determined certain time to a preset maximum buffering time, and
determine whether to transmit the content in the streaming mode, according to a result of the comparing of the determined certain time to the preset maximum buffering time.

19. A method for reproducing content, the method comprising:
receiving, by the sync terminal, content to be reproduced from a source terminal;
reproducing, by the sync terminal, the content in a mirroring mode if a preset condition is not satisfied;
buffering, by the sync terminal, image data corresponding to the content to be reproduced; and
reproducing, by the sync terminal, the buffered content by switching to a streaming mode if the preset condition is satisfied,
wherein the sync terminal switches between the mirroring mode and streaming mode based on the preset condition.

20. The method of claim 19, wherein the preset condition relates to at least one of a network condition, a characteristic of the content, and an extent to which the image data corresponding to the content is buffered.

* * * * *